(12) United States Patent
Albert et al.

(10) Patent No.: US 9,334,061 B2
(45) Date of Patent: May 10, 2016

(54) BAFFLE CONFIGURATION FOR A LIQUID STORAGE TANK

(71) Applicant: The Boeing Company, Chicago, IL (US)

(72) Inventors: Jeremie J. Albert, Philadelphia, PA (US); Jeffrey M. Thomas, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 337 days.

(21) Appl. No.: 14/163,796

(22) Filed: Jan. 24, 2014

(65) Prior Publication Data

US 2015/0210162 A1 Jul. 30, 2015

(51) Int. Cl.
| | | |
|---|---|---|
| *B64D 37/08* | (2006.01) | |
| *B60K 15/03* | (2006.01) | |
| *B60K 15/077* | (2006.01) | |
| *B64D 37/04* | (2006.01) | |

(52) U.S. Cl.
CPC .............. *B64D 37/08* (2013.01); *B60K 15/077* (2013.01); *B64D 37/04* (2013.01); *B60K 2015/0344* (2013.01); *B60K 2015/0777* (2013.01)

(58) Field of Classification Search
CPC .................... B60K 2015/0344; B60K 15/077; B60K 2015/0777; B64D 37/08
USPC ................ 220/563, 502, 501, 4.14, 562, 506, 220/4.15; 137/574, 44
See application file for complete search history.

(56) References Cited

U.S. PATENT DOCUMENTS

| | | | | |
|---|---|---|---|---|
| 2,678,660 A | * | 5/1954 | Gurin ................... | B64D 37/005 137/498 |
| 6,564,961 B1 | * | 5/2003 | Klein .................... | B60P 3/2235 137/574 |
| 6,568,556 B1 | | 5/2003 | Kahler, Jr. et al. | |
| 7,975,869 B2 | | 7/2011 | Park | |
| 2008/0035649 A1 | * | 2/2008 | Ohlsson ................. | B60K 15/03 220/564 |
| 2009/0223975 A1 | * | 9/2009 | McCallister ............ | B60P 3/221 220/563 |
| 2011/0272413 A1 | * | 11/2011 | Yaremenko ........ | B65D 88/1606 220/563 |
| 2011/0272526 A1 | * | 11/2011 | Barbosa .................. | B64C 17/10 244/135 A |
| 2012/0006815 A1 | * | 1/2012 | Sendlhofer .......... | B60K 15/077 220/4.14 |

* cited by examiner

*Primary Examiner* — Jeffrey Allen
*Assistant Examiner* — Jennifer Castriotta

(57) ABSTRACT

A tank system may include a tank having a tank volume and mounted in a vehicle having a system CG and a system CG offset limit. The tank system may further include at least one outer baffle having an outer baffle port and dividing the tank volume into an inner compartment and at least one outer compartment. The outer baffle may be positioned such that when the outer baffle port is open and the combined volume of liquid in the inner and outer compartment is less than a total inner compartment volume, the system CG may exceed the system CG offset limit during a shift of a liquid CG, and when the outer baffle port is closed and the outer compartment is substantially empty of liquid, the system CG remains within the system CG offset limit during a shift of the liquid CG for at least one fill level of the inner compartment.

20 Claims, 9 Drawing Sheets

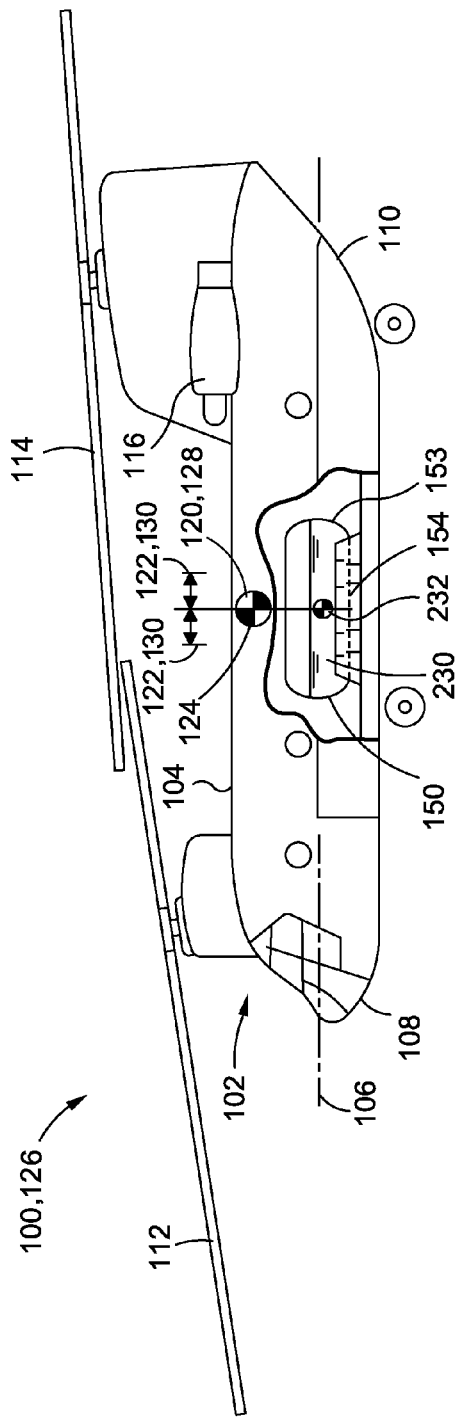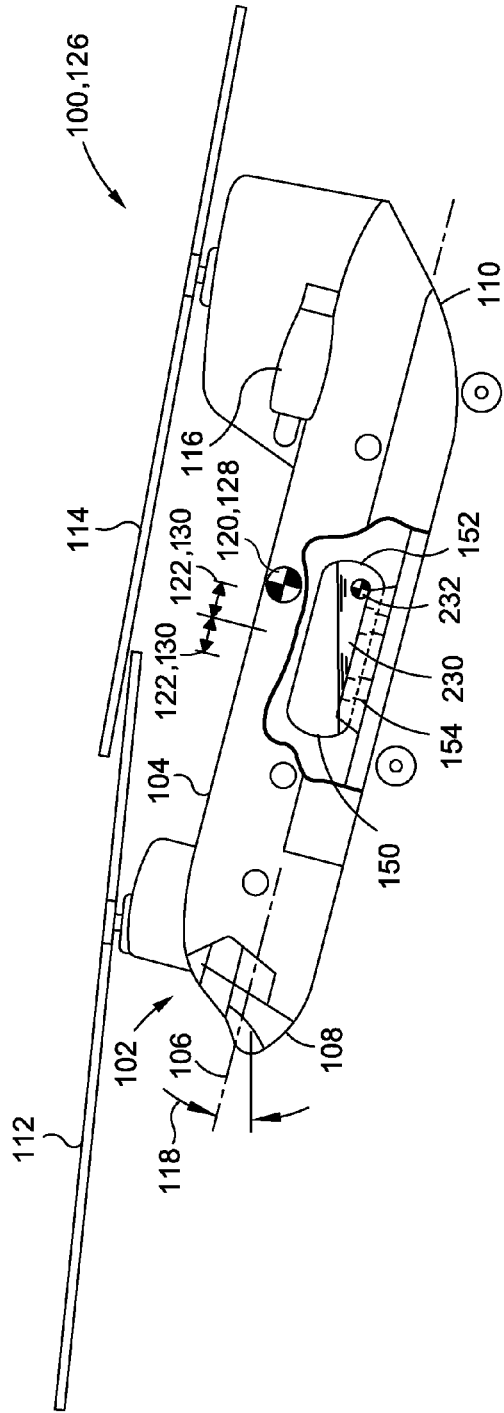

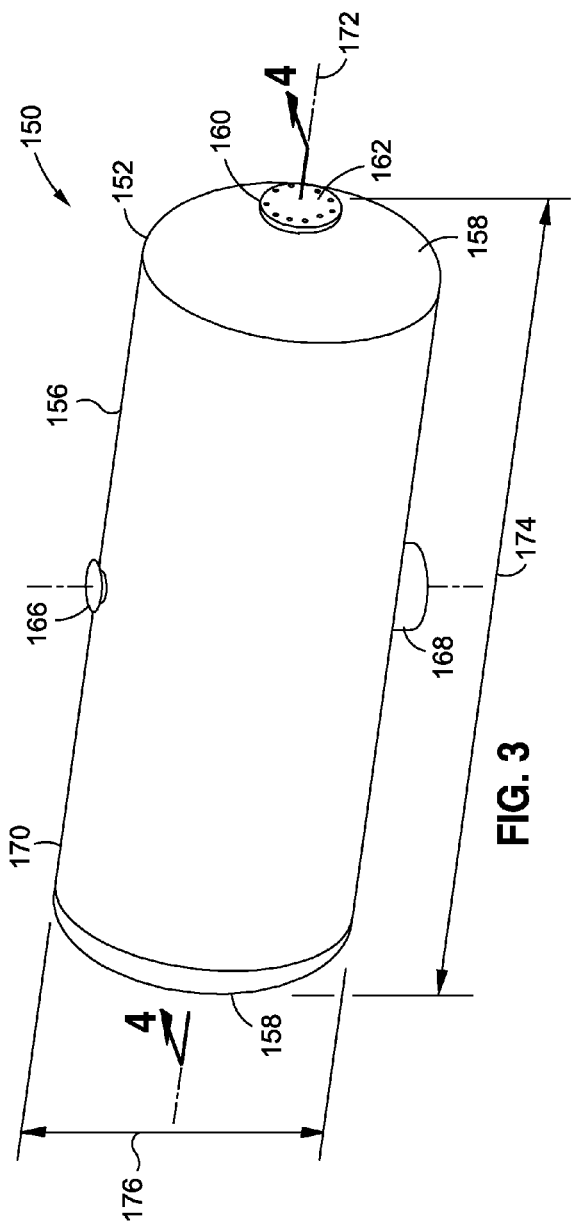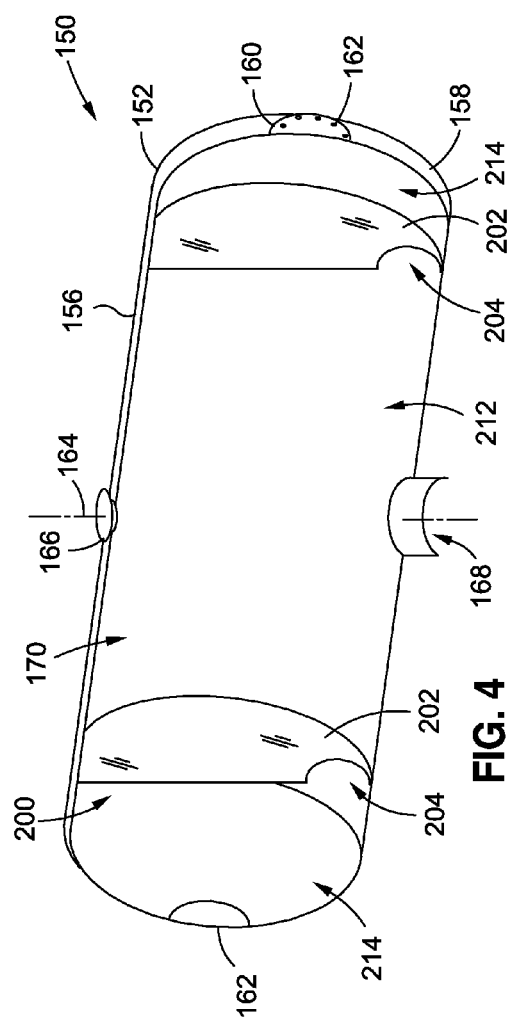

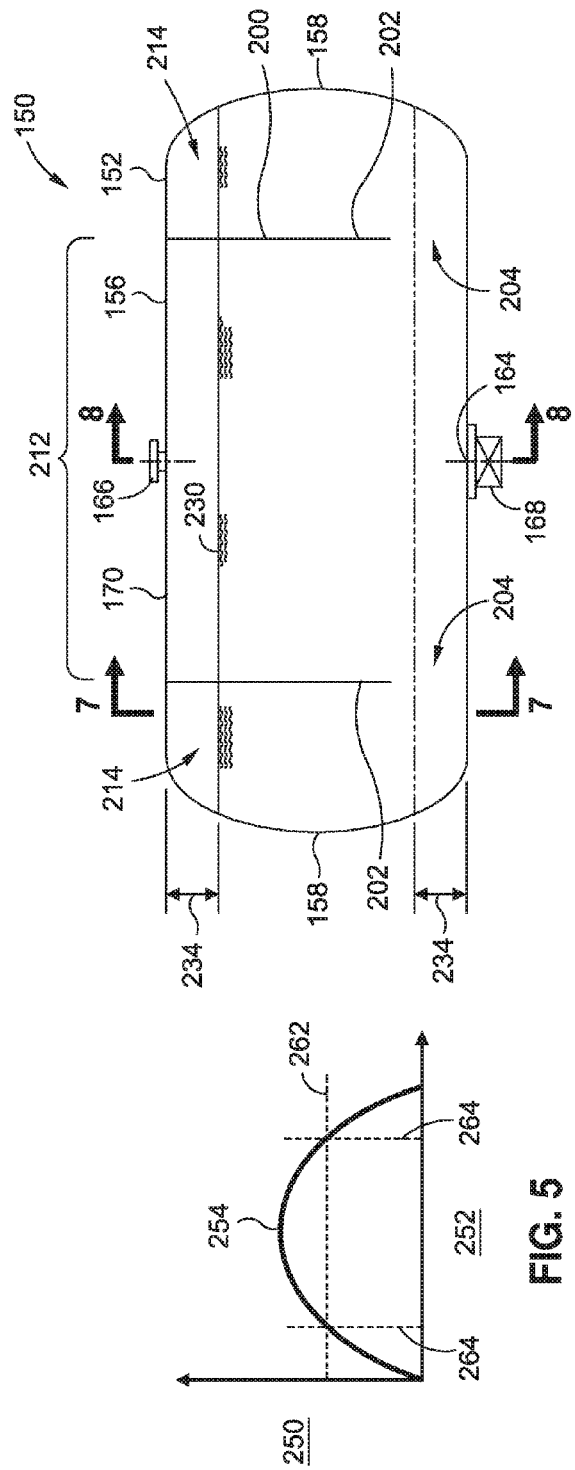
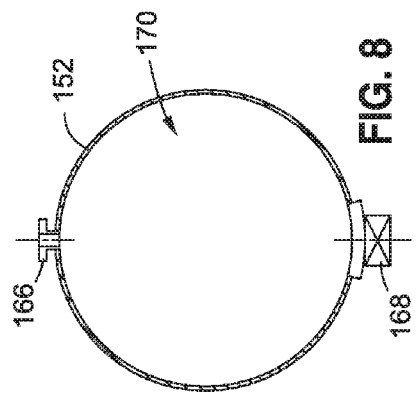
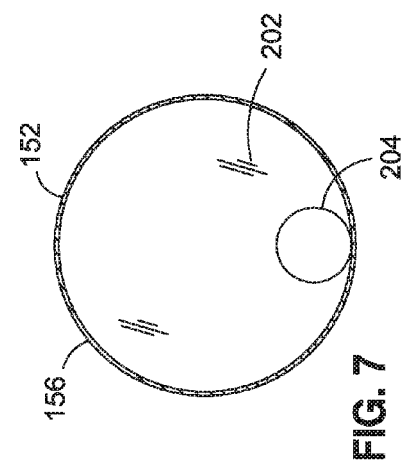

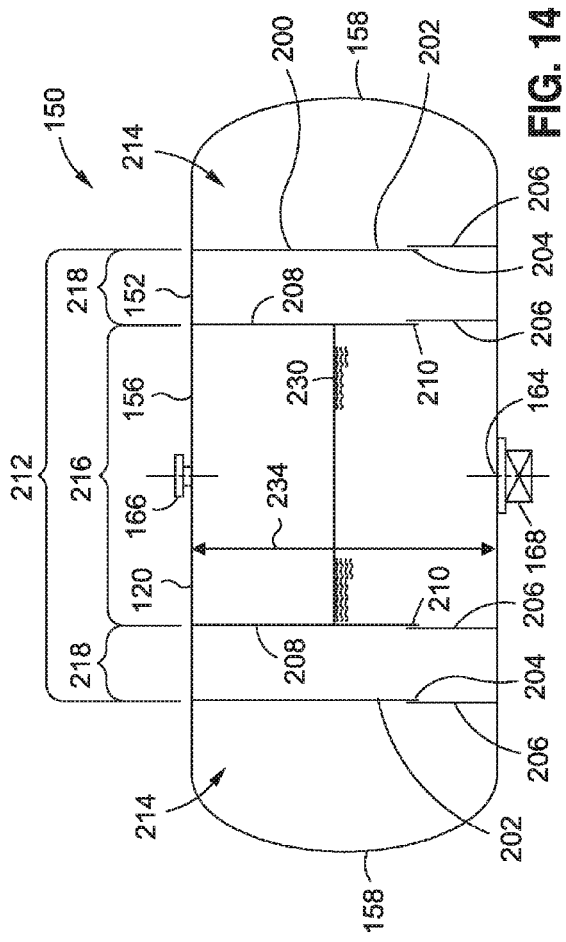
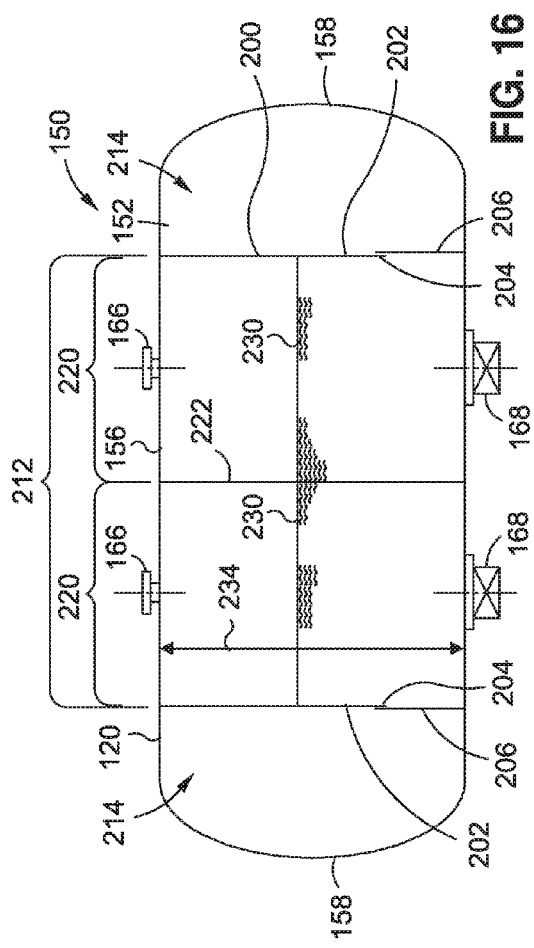
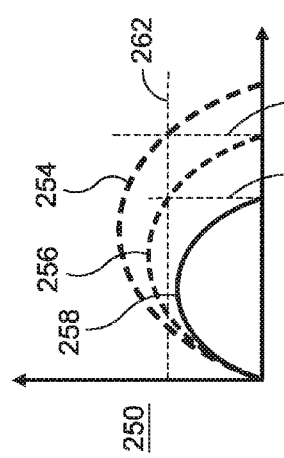
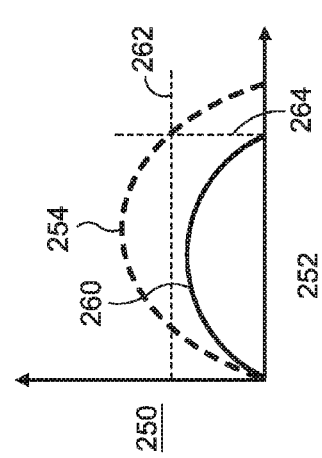

BAFFLE CONFIGURATION FOR A LIQUID STORAGE TANK

FIELD

The present disclosure relates generally to liquid storage tanks and, more particularly, to a tank system and method for limiting excessive shift of a vehicle center of gravity due to liquid motion within a storage tank.

BACKGROUND

Aircraft regulatory agencies such as the Federal Aviation Administration (FAA) typically require aircraft manufacturers to demonstrate that an aircraft meets certain performance and safety requirements prior to certification of the aircraft. Aircraft manufacturers typically perform a series of flight tests in a flight test program designed to demonstrate the performance and safety requirements of the aircraft. During flight testing of an aircraft, one or more ballast tanks may be installed in the aircraft. The ballast tanks may be filled with water to provide ballast for simulating the mass of passengers, cargo, or other equipment that may be carried by the aircraft during normal operations.

During a flight test, an aircraft may undergo directional changes in the flight path due to pilot-initiated maneuvers and/or due to turbulence encountered by the aircraft. The directional changes in the aircraft flight path may cause water in the ballast tank to temporarily move toward one side of the tank. The movement of the water within the ballast tank and corresponding shift in the center of gravity (CG) of the water may cause a shift in the aircraft CG. In order to maintain stability during flight, the CG of an aircraft must typically be maintained within a predetermined CG offset limit as may be established by the aircraft manufacturer.

For different parts of a flight testing program for an aircraft, the ballast tank may be filled to different levels prior to takeoff to simulate different amounts of mass that may be carried by the aircraft. When a conventional ballast tank is filled to either a relatively low level or a relatively high level, the CG shift of the water may be relatively small such that the shift in the aircraft CG may be maintained within the established CG offset limit. However, when the conventional ballast tank is filled to an intermediate level, the CG shift of the water may be relatively large causing the aircraft CG to exceed the established CG offset limit.

As can be seen, there exists a need in the art for a system and method for controlling the CG shift of liquid in a tank such that the aircraft CG is maintained within an established CG offset limit.

SUMMARY

The above-noted needs associated with limiting the shifting of the center of gravity of a vehicle due to liquid motion within a tank are specifically addressed by the present disclosure which provides a tank having a baffle system. The tank may be provided in any one of a variety of shape including, but not limited to, cylindrical rectangular, square, or any other shape. The tank may have a tank volume and may be mounted to a system such as in a vehicle. The system may have a system CG (e.g., a vehicle CG) and a system CG offset limit (e.g., a vehicle CG offset limit). The baffle system may include at least one outer baffle positioned within the tank and dividing the tank volume into an inner compartment and at least one outer compartment. The outer baffle may have an outer baffle port. The outer baffle may be positioned such that when the outer baffle port is open and the combined volume of liquid in the inner and outer compartment is less than a total inner compartment volume, the system CG may exceed the system CG offset limit during a shift of a liquid CG, and when the outer baffle port is closed and the outer compartment is substantially empty of liquid, the system CG may remain within the system CG offset limit during a shift of the liquid CG for at least one fill level of the inner compartment.

Also disclosed is a method of controlling the motion of liquid within the tank. The method may include providing a tank having a tank volume. The tank may be configured to be mounted to a system (e.g., in a vehicle) having a system CG and a system CG offset limit. The tank may have at least one outer baffle dividing the tank volume into an inner compartment and at least one outer compartment. The method may include opening or closing an outer baffle port according to the following: opening the outer baffle port and introducing liquid into the inner and outer compartment at a combined volume greater than a total inner compartment volume, and closing the outer baffle port and introducing liquid into the inner compartment only with the outer compartment being substantially empty of liquid. The method may further include introducing liquid into the tank at a desired fill level, and preventing the system CG from exceeding the system CG offset limit during a shift of the liquid CG.

Additionally, disclosed is a method of manufacturing a tank system. The method may include providing a tank having a tank volume. In an embodiment, the tank may be configured for mounting in a system having a system CG and a system CG offset limit. The method may include providing at least one outer baffle having an outer baffle port and dividing the tank volume into an inner compartment and at least one outer compartment. The method may additionally include positioning the outer baffle such that when the outer baffle port is open and a combined volume of liquid in the inner and outer compartment is less than a total inner compartment volume, the system CG may exceed the system CG offset limit during a shift of a liquid CG, and when the outer baffle port is closed and the outer compartment is substantially empty of liquid, the system CG may remain within the system CG offset limit during a shift of the liquid CG for at least one fill level of the inner compartment.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a side view of a helicopter which has a vehicle center of gravity (CG) and a predetermined vehicle CG offset limit and further including a ballast tank system installed in the helicopter fuselage and containing liquid as ballast;

FIG. 2 is a side view of the helicopter oriented at a pitch angle during flight testing resulting in a shift in the liquid CG in the ballast tank causing the vehicle CG to exceed the vehicle CG offset limit;

FIG. 3 is a perspective view of an embodiment of a ballast tank system as may be installed in an aircraft such as a helicopter;

FIG. 4 is a sectional view of an embodiment of the tank system taken along line 4 of FIG. 3;

FIG. 5 is a plot of vehicle CG shift vs. tank fill volume and including a dashed horizontal line representing a vehicle CG offset limit;

FIG. 6 is a schematic diagram of an embodiment of a tank system having outer baffles shown in an open configuration and further illustrating the tank containing a combined volume of liquid in the inner and outer compartment that is greater than the total inner compartment volume such that the vehicle CG remains within vehicle CG offset limit during a shift of the liquid CG;

FIG. 7 is a sectional view of the tank taken along line 7 of FIG. 6 and illustrating an outer baffle port formed in an outer baffle;

FIG. 8 is a sectional view of the tank taken along line 8 of FIG. 6 and illustrating a tank inlet and a tank outlet for respectively introducing and discharging liquid from the tank;

FIG. 13 is a plot of vehicle CG shift vs. tank volume and illustrating a CG offset curve in solid font of the inner sub-compartment and which is below the dashed horizontal line representing the vehicle CG offset limit;

FIG. 14 is a sectional side view of the tank system showing the inner baffles in a closed configuration and the inner sub-compartments containing liquid for which the vehicle CG remains within the CG offset limit for any fill level within the inner sub-compartment according to the plot of FIG. 13;

FIG. 15 is a plot of vehicle CG shift vs. tank volume and illustrating a CG offset curve in solid font corresponding to a pair of sub-compartments formed by a single inner baffle dividing the inner compartment;

FIG. 16 is a sectional side view of the tank system showing a single inner baffle subdividing the inner compartment into a pair of four which the vehicle CG remains within the CG offset limit for any fill level within one or both of the sub-compartments according to the plot of FIG. 15;

DETAILED DESCRIPTION

Figure 10:
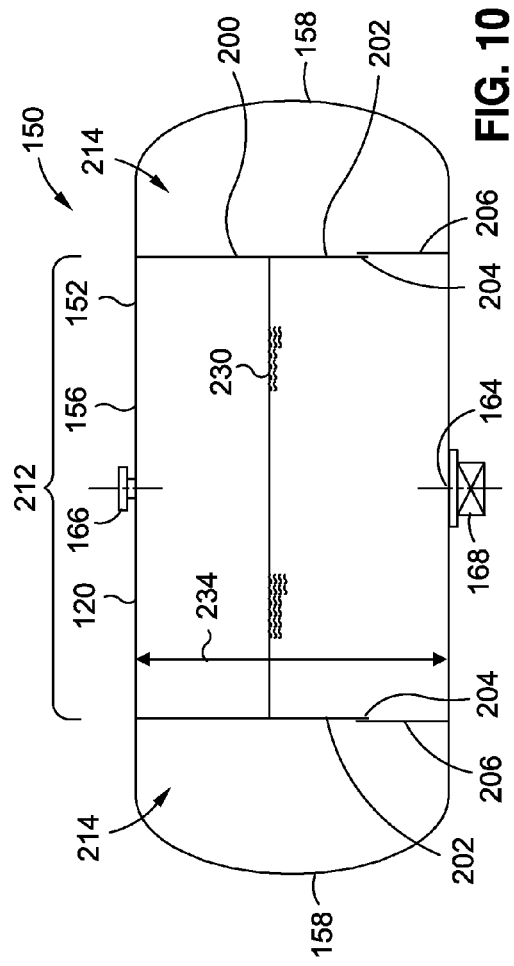
FIG. 10 is a schematic diagram of the tank system showing the outer baffles in a closed configuration and the inner compartment containing liquid for which the vehicle CG remains within the CG offset limit for any fill level of the inner compartment according to the plot of FIG. 9.

Referring now to the drawings wherein the showings are for purposes of illustrating preferred and various embodiments of the disclosure, shown in FIG. 1 is a side view of a helicopter 102. The helicopter 102 may include a fuselage 104 or cabin having a forward 108 end and an aft 110 end and a longitudinal axis 106. The helicopter 102 may additionally include a forward rotor 112 and an aft rotor 114 which may be driven by one or more engines 116 mounted to the fuselage 104. The helicopter 102 may have a vehicle (center of gravity) CG 120 and forward and aft vehicle CG offset limits 122. The distance between the forward and aft vehicle CG offset limits 122 may represent the range within which the vehicle CG 120 may move and the helicopter 102 may remain stable. In one embodiment, the helicopter 102 may be configured such that the vehicle CG 120 may not shift more than 1 inch in either a forward direction or an aft direction relative to a static location 124 of the vehicle CG 120. However, the CG range may be greater than 1 inch in either direction. The helicopter 102 illustrated in FIG. 1 may have a neutral or static location 124.

In FIG. 1, the helicopter 102 may include a ballast tank system 150 fixedly supported on a tank support 154 and mounted within the fuselage 104. The ballast tank system 150 may be configured to contain liquid 230 such as water or other liquid. The ballast tank system 150 may be temporarily installed in the helicopter 102 as part of a flight testing program for simulating the mass of passengers, cargo, and/or equipment that may be carried by the helicopter 102 during normal flight operations. The tank 152 may be removed from the helicopter 102 at the conclusion of the flight testing program. The ballast tank 152 may be filled with different volumes of water depending on flight testing program requirements. In one example, the ballast tank 152 may have a maximum tank volume of 1000 gallons allowing the ballast tank 152 to simulate a mass of approximately 8,300 pounds when substantially filled with water. However, the ballast tank 152 may be provided in any volumetric capacity for simulating any range of mass. Advantageously, the ballast tank system 150 may include a baffle system 200 (FIG. 4) for limiting motion of the liquid 230 within the tank 152 such that the vehicle CG 120 remains within the vehicle CG offset limits 122 during shifting of the liquid 230.

It should be noted that although the tank system 150 disclosed herein is described in the context of limiting liquid motion in a vehicle ballast tank for purposes of maintaining the vehicle CG 120 within a vehicle CG offset limit 122, the tank system 150 disclosed herein may be implemented in any type of system 126 (FIGS. 1-2), without limitation, to limit liquid motion within a tank 152. In this regard, the below-described method of locating baffles within a tank 152 to limit vehicle CG shift may be applied to locating baffles within a tank 152 for any type of system 126 as a means to limit the system CG 128 (FIGS. 1-2) shift for any purpose, without limitation, and is not limited to locating baffles for maintaining a vehicle CG 120 within a predetermined vehicle CG offset limit 122. For example, the baffle system 200 disclosed herein may be implemented in a fuel tank (not shown) of any type of vehicular or non-vehicular system for limiting the motion of fuel within the fuel tank as a means to limit the magnitude of loads imposed on tank-supporting structure (not shown) due to shifting of the fuel CG. In this regard, the combination of the tank and tank-supporting structure may have a predetermined load-carrying capability which may be defined in terms of the system CG offset limit 130 (FIGS. 1-2) of the tank and tank-supporting structure. Without a baffle system 200, the shifting of fuel within the fuel tank may result in excessive loading of the tank-supporting structure. However, by locating baffles in the fuel tank using the methods disclosed herein, the system CG 128 of the tank and tank-supporting structure may remain within the system CG offset limit 130 during shifting of the fuel CG, and thereby avoiding excessive loading of the tank-supporting structure. The baffle system 200 and methods disclosed herein may be implemented in any vehicular or non-vehicular system 126, without limitation. In this regard, the baffle system 200 and methods may be implemented in any marine, ground, air, and/or space system, subsystem, assembly, application, structure, building, or any other type of application having a tank containing liquid that is subject to motion within the tank.

FIG. 2 illustrates the helicopter 102 with the ballast tank 152 mounted in the fuselage 104. The helicopter 102 is shown oriented at a relatively steep pitch angle 118. The vehicle CG 120 of the helicopter 102 may move from the static location 124 as a result of the relatively steep pitch angle 118 and/or as a result of directional changes in the helicopter 102 flight path which may cause changes in the pitch, yaw, and/or or roll of the helicopter 102. In FIG. 2, the helicopter 102 may be intentionally rotated into a high pitch angle 118 during flight testing to simulate the pitch angle 118 required for reducing the forward 108 speed of the helicopter 102 in preparation for a landing. The helicopter 102 may be maintained at the relatively large pitch angle 118 for a sustained period of time which may allow the liquid 230 within the tank 152 to shift in an aftward direction. Without a baffle system 200 in the ballast tank 152, the aftward shift of the liquid CG 232 may cause the vehicle CG 120 to exceed the vehicle CG offset limit 122.

FIG. 3 illustrates an embodiment of a tank system 150 as may be installed in a vehicle 100 such as a helicopter 102. The tank system 150 may include a tank 152 and a baffle system 200 mounted within the tank 152. The tank 152 may include a tank wall 156 defining the tank interior volume 170. The tank 152 may include at least one tank inlet 166 which may be mounted on the top of the tank 152 for introducing liquid 230 (FIG. 2) into the tank 152. The tank 152 may include at least one tank outlet 168 mounted on the bottom of the tank 152 for discharging liquid 230 from the tank 152. In an embodiment, the tank outlet 168 may be configured for jettisoning a full volume of liquid 230 from the tank 152 in a relatively short period time as a safety measure such as upon the occurrence of certain events such as an engine-out situation. The tank 152 may include an end cap 158 on one or more ends of the tank 152. Although the end caps 158 are shown having a generally hemispherical shape, the end caps 158 may be provided in any shape, without limitation. At least one of the end caps 158 may include an access hole 160 covered by an access cover 162. The access cover 162 may be mechanically fastened or otherwise attached to the end cap 158 for sealing the liquid 230 within the tank 152. Removal of the access cover 162 may allow for access to the tank 152 interior such as by a technician.

Figure 17:
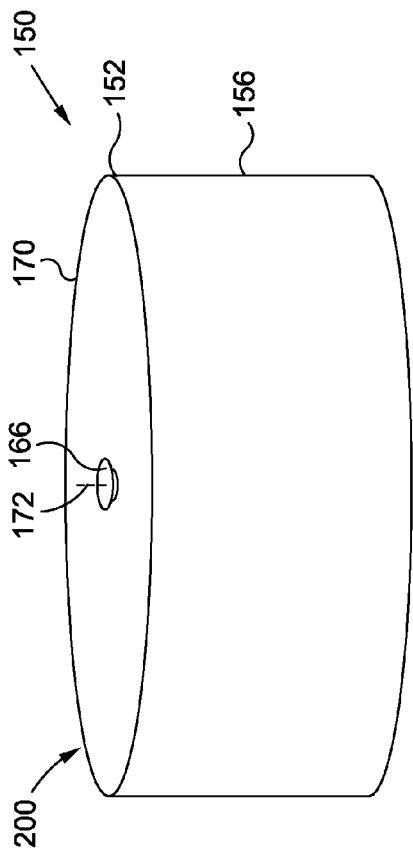
FIG. 17 is a perspective view of a further embodiment of the tank system having a cylindrical shape with a longitudinal axis in a vertical orientation.
Figure 18:
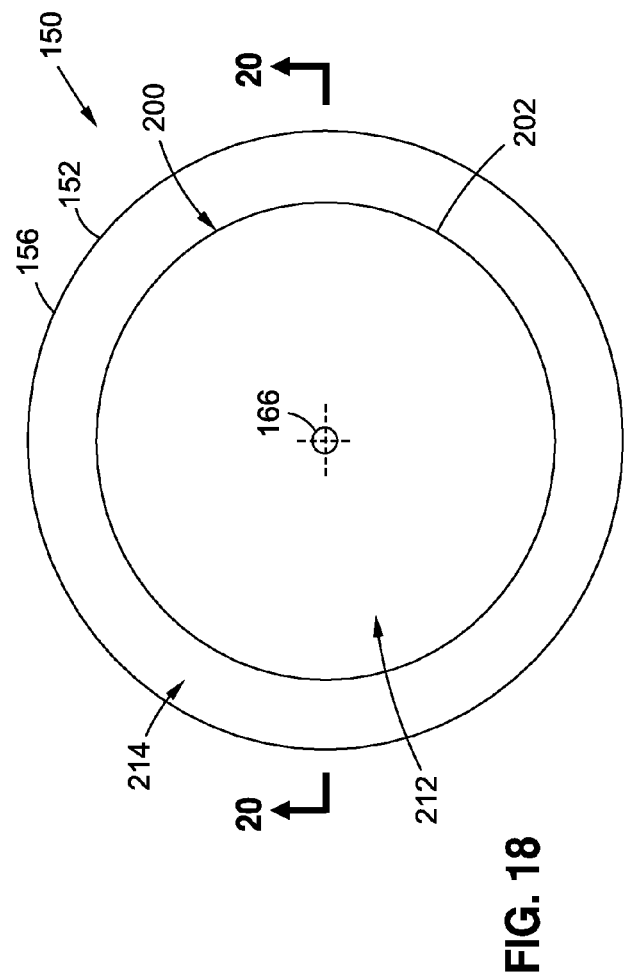
FIG. 18 is a schematic top view of the tank system of FIG. 17 and illustrating an outer baffle that is concentric with the outer tank wall and dividing the tank volume into an inner compartment and an annular outer compartment surrounding the inner compartment.

In FIG. 3, the tank 152 is shown with a cylindrical configuration oriented horizontally. The tank 152 may have a length 174 and a width 176. In an embodiment, the tank 152 may have a length-to-width aspect ratio of greater than 1. However, the tank 152 may be provided in any one of a variety of different sizes, shapes, configurations, and orientations, without limitation. For example, the tank 152 may have a cross-sectional shape that may be square, rectangular, or another polygonal cross-sectional. Alternatively, the tank 152 may have a rounded cross-sectional shape other than a cylindrical cross-sectional shape. In a further embodiment, the tank 152 may have a cross-sectional shape that may be a combination of a polygonal cross-sectional shape and a rounded cross-sectional shape. In some embodiments, the tank 152 may have a tank axis 172 that may be horizontally oriented as shown in FIGS. 3-16, or the tank axis 172 may be vertically oriented as shown in FIGS. 17-22. For example, as shown in FIG. 17-18, the tank 152 may have a generally flattened cylindrical shape with a vertically-oriented tank axis 172, as described in greater detail below.

As indicated above, the tank system 150 is not limited to implementation as a water ballast tank 152 for a vehicle 100 such as a helicopter 102. In this regard, the tank system 150 may be implemented for use in any one of a variety of different applications including, but not limited to, a fuel tank 152, a rail car carrying a fixed-volume liquid cargo, or any one of a variety of other implementations. In addition, although FIGS. 1-2 illustrate the tank system 150 implemented as a water ballast system for flight testing a helicopter 102, the tank system 150 may be implemented for use in any one of a variety of different air vehicles including any type of fixed wing aircraft, rotary wing aircraft, or combination thereof. In addition, the tank 152 may be implemented for use in land vehicles and/or space vehicles and/or non-vehicular applications.

FIG. 4 is a cutaway view of an embodiment of the tank system 150 of FIG. 3. The tank 152 may include a pair of outer baffles 202. In the embodiment shown, each one of the outer baffles 202 may be generally planar and vertically-oriented although any of the baffles disclosed herein may be provided in any size, shape, and orientation, and are not limited to planar, vertically-oriented baffles. The outer baffles 202 may be equidistantly spaced from a tank center 164 (e.g., along a horizontal direction). The outer baffles 202 may divide the tank 152 into an inner compartment 212 and a pair of outer compartments 214. As indicated above, the baffles may be positioned in a manner preventing excessive shift of the vehicle CG 120 as a result of liquid 230 motion within the tank 152. In this regard, the baffle system 200 may prevent dynamic, short-duration sloshing of the liquid 230, and sustained, long-duration shifting of the liquid 230 to an extent that the vehicle CG 120 does not exceed the vehicle CG offset limit 122.

FIG. 5 is a plot of vehicle CG shift 250 vs. tank fill volume 252 for a given maneuver of the helicopter 102 such as a 30° pitch angle 118 of the helicopter 102 as shown in FIG. 2. In this regard, the X-axis represents different levels at which the tank 152 may be filled prior to flight. The Y-axis represents the vehicle CG shift 250. The parabolic curve is the CG offset curve 254 representing the vehicle CG shift 250 for each fill level of the tank 152. The dashed horizontal line 262 is the vehicle CG offset limit 122. The upper portion of the parabolic CG offset curve 254 extending above the dashed horizontal line 262 represents liquid 230 fill levels of the tank 152 for which a shift in the liquid CG 232 results in the vehicle CG 120 exceeding the vehicle CG offset limit 122. The dashed vertical lines 264 represent locations where the CG offset curve 254 intersects the dashed horizontal line 262 of the vehicle CG offset limit 122. The left-most dashed vertical line 264 of FIG. 5 represents the tank 152 fill level below which the vehicle CG 120 remains within the vehicle CG offset limit 122. The right-most dashed vertical line 264 of FIG. 5 represents the tank 152 fill level above which the vehicle CG 120 remains within the vehicle CG offset limit 122.

FIG. 6 is a schematic diagram of an embodiment of a tank system 150 having outer baffles 202 positioned according to the plot of FIG. 5. As indicated above, the outer baffles 202 may divide the tank interior volume 170 into an inner compartment 212 and a pair of outer compartments 214 located on opposite sides of the inner compartment 212. The outer baffles 202 may be positioned such that the volume of the inner compartment 212 is substantially equivalent to the tank fill level indicated by the right-most dashed vertical line 264 in FIG. 5. In FIG. 6, the outer baffles 202 may be positioned generally equidistantly from a center 164 of the tank 152 (i.e., along a horizontal direction). Each one of the outer baffles 202 may have an outer baffle port 204.

Referring briefly to FIG. 7, shown is a cross section of the tank system 150 of FIG. 6 illustrating an outer baffle 202. The outer baffle 202 may include at least one outer baffle port 204 which, when open, may allow for liquid 230 to flow freely between the inner compartment 212 and the outer compartment 214. For certain volumes of liquid 230 to be introduced in the tank 152, the outer baffle port 204 may be closed by installing a plug 206 (FIG. 10) within the tank 152 prior to filling the tank 152 with liquid 230. By closing the outer baffle port 204, the liquid 230 may be confined to the inner compartment 212 which may minimize the extent to which the liquid CG 232 may shift, as described below.

Referring briefly to FIG. 8, shown is a cross section of a tank system 150 showing a tank inlet 166 and a tank outlet 168. As indicated above, the tank inlet 166 may be configured for introducing liquid 230 within the tank 152. The tank outlet 168 may be configured for discharging or jettisoning liquid 230 from the tank 152. Although the tank 152 is shown having a single tank inlet 166 centered on top of the tank 152 and a single tank outlet 168 centered on the bottom of the tank 152, the tank system 150 may include any number of tank inlets 166 and tank outlets 168 which may be positioned at any location.

Referring back to FIG. 6, the outer baffles 202 may be positioned in correspondence with the right-most dashed vertical line 264 in FIG. 5. The outer baffles define the inner compartment 212. When the outer baffle ports 204 are open and the combined volume of liquid 230 in the inner compartment 212 and the outer compartments 214 is less than the total inner compartment 212 volume, the vehicle CG 120 may exceed the vehicle CG offset limit 122 during a shift of the liquid CG 232, as represented by the portion of the CG offset curve 254 that extends above the dashed horizontal line 262 of FIG. 5. At such location of the outer baffles 202, when the outer baffle ports 204 are open and the combined volume of liquid 230 in the inner and outer compartments 212, 214 is greater than the total inner compartment 212 volume, the vehicle CG 120 may remain within the vehicle CG offset limit 122 during a shift of the liquid CG 232, as represented by the portion of the CG offset curve 254 that is below the dashed horizontal line 262 and on the right-hand side of the right-most dashed vertical line 264 of FIG. 5. In this regard, the lowermost vertical dimension 234 in FIG. 6 corresponds to the volume of liquid 230 represented by the left-most dashed vertical line 264 of FIG. 5, and represents the fill levels within which the vehicle CG 120 remains within the vehicle CG offset limit 122 during shifting of the liquid 230 such as may be caused by a maneuver by the vehicle 100. The uppermost vertical dimension 234 in FIG. 6 corresponds to the volume of liquid 230 represented by the right-most dashed vertical line 264 of FIG. 5, and represents the fill levels within which the vehicle CG 120 remains within the vehicle CG offset limit 122 during shifting of the liquid 230. With the outer baffle ports 204 open, at any fill level of the tank 152 between the lowermost vertical dimension 234 and the uppermost vertical dimension 234, the vehicle CG 120 may exceed the vehicle CG offset limit 122 during a shift of the liquid CG 232.

Figure 9:
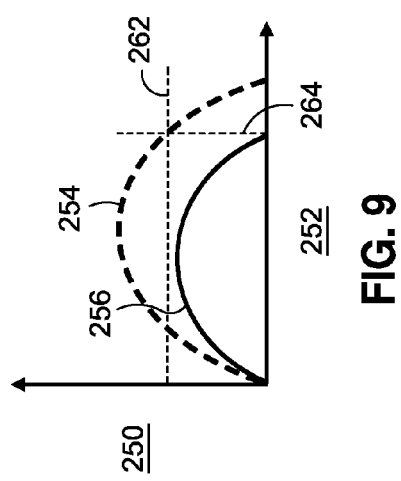
FIG. 9 is a plot of vehicle CG shift vs. tank volume and illustrating in dashed font a CG offset curve of the inner and outer compartment and further illustrating in solid font a CG offset curve of the inner compartment and which is located below the dashed horizontal line representing the vehicle CG offset limit.

Referring to FIG. 9, shown is a plot of vehicle CG shift 250 vs. tank fill volume 252 and illustrating in dashed font the CG offset curve 254 of the combined liquid 230 in the inner and outer compartments 212, 214. As indicated above, the CG offset curve 254 in dashed font represents the vehicle CG shift 250 resulting from liquid 230 motion in the inner compartment 212 and the outer compartments 214 (e.g., with outer baffles 202 open). The dashed vertical line 264 of FIG. 9 represents the tank 152 fill level above which the vehicle CG 120 remains within the vehicle CG offset limit 122. The plot of FIG. 9 further illustrates in solid font a CG offset curve 256 representing the vehicle CG shift 250 resulting from liquid 230 motion in the inner compartment 212 only (e.g., with the outer compartments 214 empty). The CG offset curve 256 in solid font is below the dashed horizontal line 262, which indicates that for any fill level of the inner compartment, the vehicle CG 120 will remain within the vehicle CG offset limit 122 during a shift of the liquid CG 232.

FIG. 10 schematically illustrates the tank system 150 of FIG. 6 except that the outer baffles 202 are closed by installing plugs 206 in the outer baffle ports 204. The outer compartments 214 are substantially empty of liquid 230. As described above with regard to the plot of FIG. 9, for any fill level of the inner compartment 212 in FIG. 10, the vehicle CG 120 will remain within the CG offset limit 122. In an embodiment, the plugs 206 may be installed such as by a technician entering the tank 152 interior after removing the access cover 162 covering an access hole 160 in an end cap 158 of the tank 152 as shown in FIG. 3. In other embodiments, the tank 152 may include a mechanism (not shown) for selectively opening or closing the baffle ports by remote control (not shown) from outside the tank 152. In an embodiment, the tank 152 may include a one-way door (not shown) such as a flapper valve hingedly coupled to each baffle port 204. The flapper valve may be spring-loaded and may be configured to hinge inwardly in one direction only. For example, the door may hinge inwardly toward a direction that allows liquid to flow from the outer compartment 214 into the inner compartment 212, and results in the door shutting when liquid attempts to flow from the inner compartment 212 into the outer compartment 214.

Figure 12:
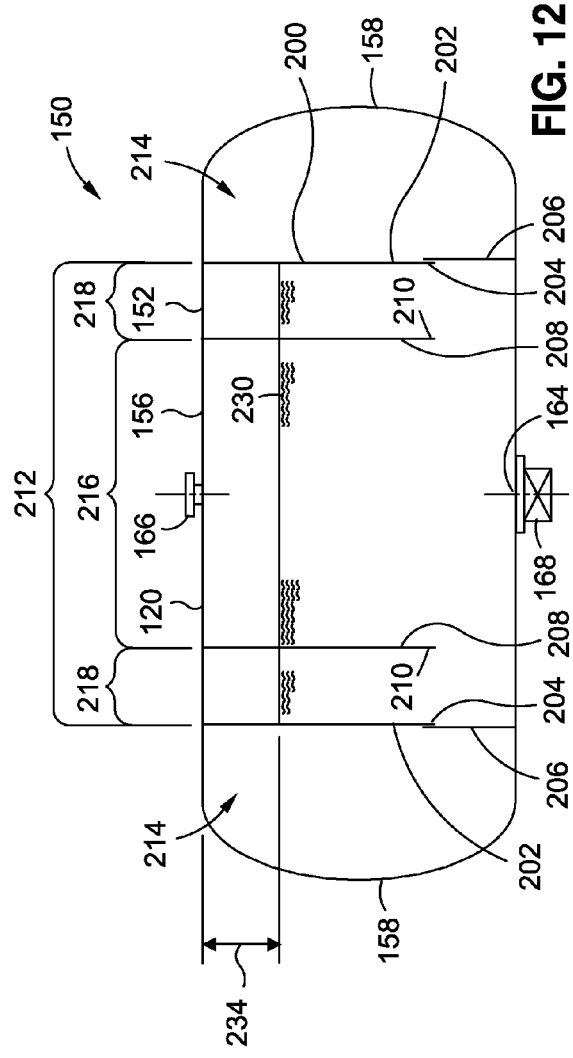
FIG. 12 is a sectional side view of a tank system having a pair of inner baffles in an open configuration and dividing the inner compartment into an inner sub-compartment and a pair of outer sub-compartments.
Figure 11:
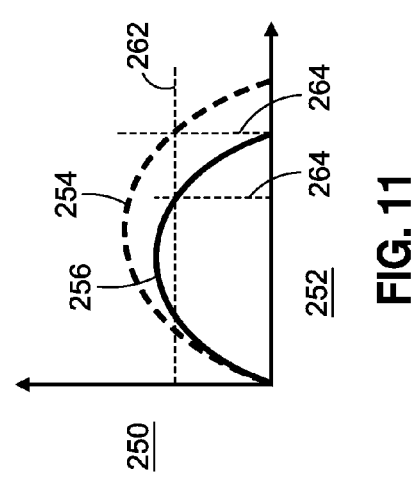
FIG. 11 is a plot of vehicle CG shift vs. tank volume and illustrating an embodiment wherein a portion of the CG offset curve extends above the dashed horizontal line of the vehicle CG offset limit and representing fill levels for the inner compartment wherein the vehicle CG exceeds the vehicle CG offset limit.

FIG. 11 is a plot of vehicle CG shift 250 vs. tank fill volume 252 in an embodiment wherein a portion of the solid font CG offset curve 256 extends above the dashed horizontal line 262. As indicated above, the dashed horizontal line 262 represents the vehicle CG offset limit 122. The solid font CG offset curve 256 illustrates an embodiment of a tank system 150 wherein certain fill levels of the inner compartment 212 only (i.e., with the outer compartments 214 empty) result in the vehicle CG 120 exceeding the vehicle CG offset limit 122. The right-most dashed vertical line 264 represents the inner compartment 212 fill level above which the vehicle CG 120 remains within the vehicle CG offset limit 122 during shifting of liquid 230 with the inner compartment 212. In this regard, the right-most dashed vertical line 264 in FIG. 11 represents a location of the outer baffles 202. The left-most dashed vertical line 264 is positioned at the intersection of the solid font CG offset curve 256 with the dashed horizontal line 262 of the vehicle CG offset limit 122. The left-most dashed vertical line 264 in FIG. 11 represents a location of the inner baffles 208 which define an inner sub-compartment 216 separating a pair of outer sub-compartments 218 as shown in FIG. 12. In this regard, the left-most dashed vertical line 264 of FIG. 11 represents the inner sub-compartment 216 fill level above which the vehicle CG 120 remains within the vehicle CG offset limit 122 during shifting of liquid 230 with the inner sub-compartment 216 (i.e., with the remaining portions of the tank empty).

FIG. 12 is a sectional side view of the tank system 150 having a pair of inner baffles 208 each located inboard of an outer baffle 202. As indicated above, the inner baffles 208 divide the inner compartment 212 into an inner sub-compartment 216 and a pair of outer sub-compartments 218 located on opposite sides of the inner sub-compartment 216. The inner baffles 208 may include inner baffle ports 210 which may be opened and closed depending on the desired volume of liquid 230 to be introduced into the tank 152. In FIG. 12, the inner baffles 208 are shown in an open configuration. When the inner baffle ports 210 are open and the combined volume of liquid 230 in the inner sub-compartment 216 and outer sub-compartments 218 is less than the total (e.g., empty) volume of the inner sub-compartment 216, a shift in the liquid CG 232 causes the vehicle CG 120 to exceed the vehicle CG offset limit 122.

FIG. 13 is a plot of vehicle CG shift 250 vs. tank fill volume 252 similar to the plot of FIG. 11 except that the plot of FIG. 13 illustrates in solid font CG offset curve 258 representing the CG offset for different fill levels of liquid 230 in the inner sub-compartment 216 only, and with the outer compartment 214 and outer sub-compartment 218 being substantially empty of liquid 230. The solid font CG offset curve 258 in FIG. 13 is completely below the dashed horizontal line 262 which indicates that for any fill level of the inner sub-compartment 216, the vehicle CG 120 remains within the vehicle CG offset limit 122 during shifting of the liquid 230 within the inner sub-compartment 216.

FIG. 14 is a sectional side view of a tank system 150 schematically illustrating the inner baffles 208 in a closed configuration such as by installing plugs 206 over the inner baffle ports 210. The inner sub-compartment 216 contains liquid 230 and the outer compartments 214 and outer sub-compartments 218 are substantially empty of liquid 230. As indicated by the plot of FIG. 13, the inner baffles 208 are positioned such that the inner sub-compartment 216 may be filled to any fill level and the vehicle CG 120 will remain within the CG offset limit during shifting of the liquid CG 232 within the inner sub-compartment 216. With all of the baffle ports 204, 210 being open, if the total volume of liquid 230 in the tank is less than the combined volume of the inner sub-compartment 216 and the outer sub-compartments 218, then the vehicle CG 120 may exceed the vehicle CG offset limit 122. However, if the outer baffle ports 204 are closed (e.g., the plugs 206 are installed), and the outer compartments 214 are void of liquid 230, and the combined volume of liquid 230 in the inner sub-compartment 216 and the outer sub-compartments 218 is greater than the total volume of the inner sub-compartment 216, then the vehicle CG 120 may remain with the vehicle CG offset limit 122.

FIG. 15 is a plot of vehicle CG shift 250 vs. tank fill volume 252 and illustrating in solid font a CG offset curve 260. The solid font CG offset curve 260 is completely below the dashed horizontal line 262 representing the vehicle CG offset limit 122. The solid font CG offset curve 260 represents the vehicle CG shift 250 for different fill levels of a pair of sub-compartments 220 formed by a single inner baffle 222 dividing the inner compartment 212.

FIG. 16 is a sectional side view of an embodiment of a tank system 150 having a single inner baffle 222 represented by the plot of FIG. 15. The single inner baffle 222 subdivides the inner compartment 212 into a pair of sub-compartments 220 for which the vehicle CG 120 remains within the CG offset limit for any fill level within one or both of the sub-compartments 220 according to the plot of FIG. 15. In the embodiment shown, the single inner baffle 222 is positioned such that the pair of sub-compartments 220 are of substantially equal volume. However, the single inner baffle 222 may be positioned at a location that results in unequal volumes for the pair of sub-compartments 220. In an embodiment, the inner baffle 208 may be positioned within the inner compartment 212 such that when either one or both of the sub-compartments 220 contain liquid 230 at any fill level, the baffle may prevent the vehicle CG 120 from exceeding the vehicle CG offset limit 122 during a shift of the liquid CG 232. The single inner baffle 222 in FIG. 16 may be provided without a baffle port such that each one of the sub-compartments 220 may have a dedicated tank inlet 166 and a dedicated tank outlet 168.

FIG. 17 illustrates a further embodiment of a tank system 150 wherein the tank 152 has a cylindrical shape with a vertically-oriented tank axis 172 (i.e., a vertically-oriented cylindrical tank). The tank 152 is shown having a generally flattened cylindrical configuration. However, the tank 152 may be provided in any shape and is not limited to a vertically-oriented cylindrical configuration. The tank 152 may include a tank inlet 166 on a top of the tank 152 and a tank outlet (not shown) on a bottom of the tank 152.

FIG. 18 is a schematic top view of the tank system 150 of FIG. 17 and showing an outer baffle 202. The outer baffle 202 may be concentrically-positioned relative to an outer tank wall 156. The outer baffle 202 may divide the tank interior volume 170 into an inner compartment 212 and an outer compartment 214 having an annular shape which may surround the inner compartment 212. In a further embodiment of the tank system not shown, a vertically-oriented cylindrical tank may include one or more pairs of baffles oriented parallel to one another. For example, when such a vertically-oriented cylindrical tank is viewed from above, the baffles would appear as off-center section cuts through the vertically-oriented cylindrical tank similar to the parallel baffles shown in FIGS. 4, 6, 8, 12, 14, and 16, except that instead of the baffles (e.g., baffles 202, 208) having a cylindrical shape to match the horizontally-oriented cylindrical tank as shown in FIG. 4, the parallel baffles in a vertically-oriented cylindrical tank may each have a generally rectangular shape or a square shape, depending on the height of the tank. Parallel baffles in such a vertically-oriented cylindrical tank would be positioned according to the same rules discussed above with regard to position the baffles for the horizontally-oriented cylindrical tank shown in FIGS. 4, 6, 8, 12, 14, and 16.

Figure 19:
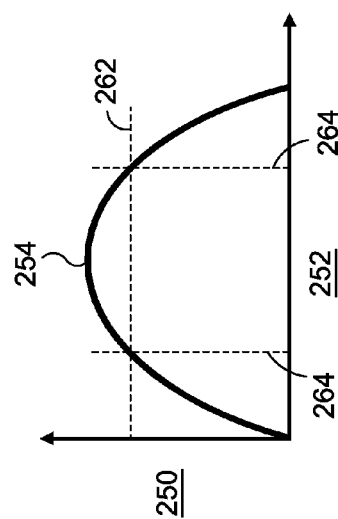
FIG. 19 is a plot of vehicle CG shift vs. tank volume and illustrating in solid font a CG offset curve for the inner and outer compartment.

FIG. 19 is a plot of vehicle CG shift 250 vs. tank fill volume 252 for the tank 152 configuration shown in FIG. 17. The plot illustrates in solid font a CG offset curve 254 representing the vehicle CG shift 250 for different fill levels of the tank 152 resulting in a shift in the liquid 230 contained within the tank 152. As indicated above, the dashed horizontal line 262 represents the vehicle CG offset limit 122 of the vehicle 100 into which the tank system 150 may be installed. The dashed vertical line 264 represents the intersection of the CG offset curve 254 with the dashed horizontal line 262 and corresponds to a fill volume 252 of the tank 152 representing the location of the outer baffle 202, as described below.

Figure 20:
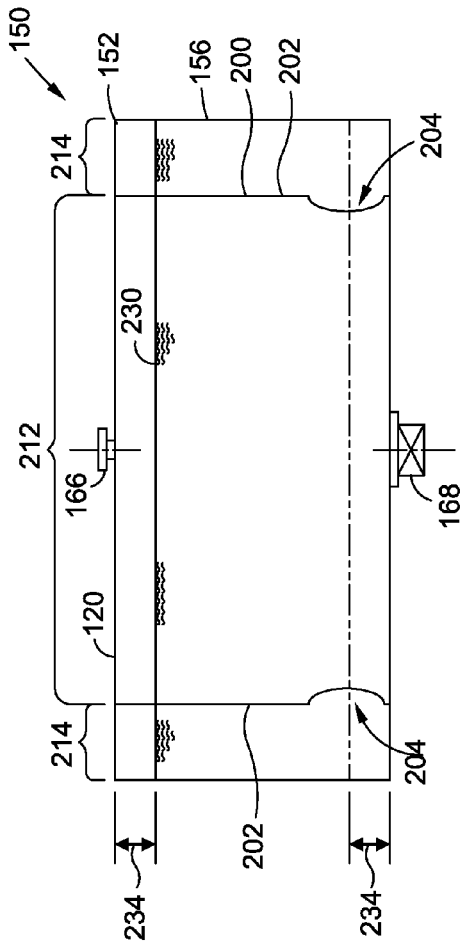
FIG. 20 is a sectional side view of the tank system taken along line 20 of FIG. 18 and illustrating the outer baffle in an open configuration and further illustrating the tank containing a combined volume of liquid in the inner and outer compartment that is greater than the total inner compartment volume such that the vehicle CG remains within vehicle CG offset limit during a shift of the liquid CG according to the plot of FIG. 19.

FIG. 20 is a sectional view of the tank 152 of FIG. 18 showing the cylindrical outer baffle 202 having one or more outer baffle ports 204. In the embodiment shown, the outer baffle ports 204 are in an open configuration allowing liquid 230 to flow between the inner compartment 212 and the outer compartment 214. The outer baffle 202 may be positioned according to the fill level represented by the dashed vertical line 264 of FIG. 19 such that when the outer baffle port 204 is open and the combined volume of liquid 230 in the inner and outer compartment 212, 214 is less than the total inner compartment 212 volume, the vehicle CG 120 may exceed the vehicle CG offset limit 122 during a shift of the liquid CG 232. Conversely, when the outer baffle port 204 is open and the combined volume of liquid 230 in the inner and outer compartment 212, 214 is greater than the total inner compartment 212 volume, the vehicle CG 120 may remain within the vehicle CG offset limit 122 during a shift of the liquid CG 232, as indicated by the vertical dimensions shown in FIG. 20.

Figure 21:
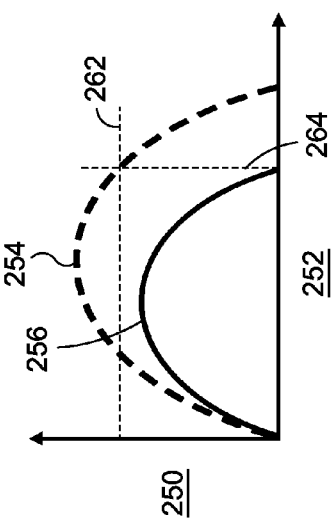
FIG. 21 is a plot of vehicle CG shift vs. tank volume and illustrating in dashed font a CG offset curve of the inner and outer compartment and further illustrating in solid font a CG offset curve of the inner compartment and which is below the dashed horizontal line representing the vehicle CG offset limit.

FIG. 21 is a plot of vehicle CG shift 250 vs. tank fill volume 252 and illustrating in dashed font a CG offset curve 254 for the case where liquid 230 is contained within the inner and outer sub-compartment 216, 218. The plot of FIG. 21 also illustrates in solid font a CG offset curve 256 representing the vehicle CG shift 250 for different fill levels of the inner compartment 212 when the outer baffle 202 is closed and the outer compartment 214 is substantially empty of liquid 230. As shown in the plot of FIG. 21, the solid font CG offset curve 256 is completely below the dashed horizontal line 262 indicating that the inner compartment 212 may be filled to any fill level and the vehicle CG 120 will remain within the CG offset limit 122.

Figure 22:
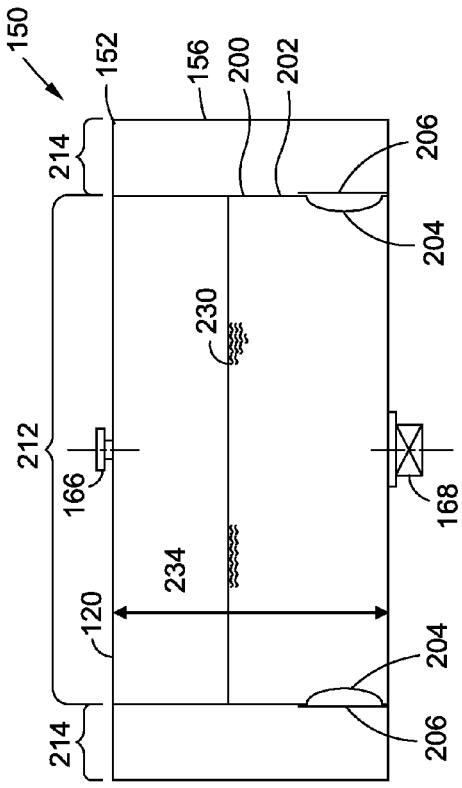
FIG. 22 is a sectional side view of the tank system showing the outer baffle in a closed configuration and the inner compartment containing liquid for which the vehicle CG remains within the CG offset limit for any fill level of liquid within the inner compartment according to the plot of FIG. 21.

FIG. 22 is a sectional side view of the tank system 150 showing the outer baffle 202 in the closed configuration. As indicated above, a plug 206 may be installed within each one of the outer baffle ports 204 in order to seal the inner compartment 212 from the outer compartment 214. In FIG. 22, the outer baffle 202 is positioned such that the inner compartment 212 may contain liquid 230 at any fill level and the vehicle CG 120 may remain within the CG offset limit in accordance with the plot of FIG. 21. However, for cases where a portion of the solid font CG offset curve 256 extends above the dashed horizontal line 262 of FIG. 21, a concentric inner baffle 208 may be positioned within the tank 152 according the same principles described above for positioning inner baffles 208 in a horizontally oriented tank 152 as shown in FIGS. 11-14. The tank system 150 of FIGS. 17-22 represents an alternative tank configuration for storing different quantities of liquid 230 and limiting the shifting of the liquid 230.

Figure 23:
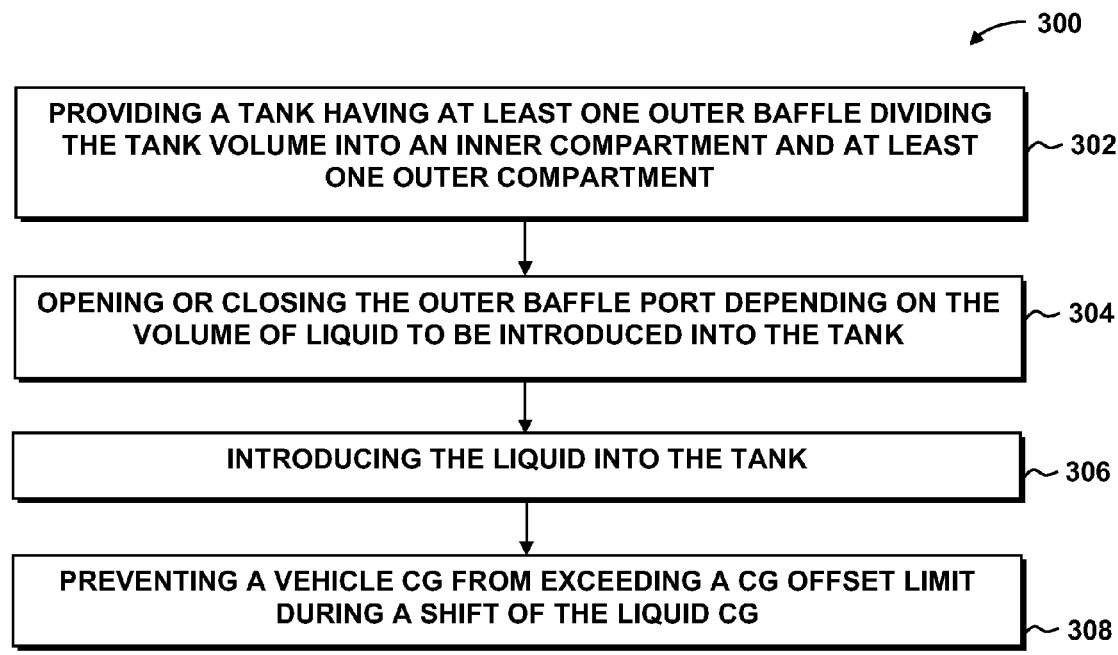
FIG. 23 is an illustration of a flow chart having one or more operations that may be included in a method of controlling the motion of liquid within a tank.

FIG. 23 shows a flow chart including one or more operations that may be included in a method 300 of controlling the motion of liquid 230 within a tank 152. The method 300 may include step 302 of providing a tank 152 having a tank interior volume 170 for containing liquid 230. In one example, the tank 152 may have a tank axis 172 oriented horizontally and may have a generally cylindrical cross-sectional shape as shown in FIGS. 3-4 and described above. Alternatively, the tank 152 may have a tank axis 172 oriented vertically as shown in FIGS. 17-18. However, the tank 152 may be provided in any one of a variety of different sizes, shapes, and configurations. In some embodiments, the tank 152 may be configured as a ballast tank 152 for mounting in an aircraft for a flight testing program. However, the tank 152 may be implemented for any one of a variety of applications and is not limited to a water ballast tank 152 for a flight testing program. For example, the tank 152 may be implemented as a fuel tank 152 in a fixed wing aircraft or a rotary wing aircraft. The tank 152 may have a pair of outer baffles 202 dividing the tank interior volume 170 into an inner compartment 212 and a pair of outer compartments 216 as shown in FIGS. 4, 6, and 10. Alternatively, for a vertical cylindrical tank 152 shown in FIGS. 18, 20, and 22, the tank 152 may include an outer baffle 202 that may be concentric with the cylindrical tank wall 156.

Step 304 of the method 300 may include opening or closing the outer baffle ports 204 depending upon the volume of liquid 230 to be introduced into the tank 152. For example, the method may include opening the outer baffle ports 204 if the volume of liquid 230 to be introduced into the inner and outer compartments 212, 214 has a combined volume that is greater than the total inner compartment 212 volume. The outer baffle ports 204 may be opened or closed by respectively removing or installing plugs 206 for covering the outer baffle ports 204. Physical access by a technician into the tank 152 interior for removing the plugs 206 may be provided by removing an access cover 162 (e.g., see FIG. 3). Alternatively, the plugs 206 may be coupled to an internal actuator (not shown) which may be remotely operated from outside the tank 152. As indicated above, the outer baffles 202 may be positioned such that when the combined volume of liquid 230 in the inner and outer compartments 212, 214 is less than the total inner compartment 212 volume, the vehicle CG 120 may exceed the vehicle CG offset limit 122 during a shift of the liquid CG 232. For conditions were a smaller volume of liquid 230 is required, the method may include closing the outer baffle port 204 and introducing liquid 230 into the inner compartment 212 with the outer compartment 214 being substantially empty of liquid 230.

Step 306 of the method 300 may include introducing liquid 230 into the tank 152 such as through one or more tank inlets 166 that may be mounted on top of the tank 152 or at other locations on the tank 152. The desired volume of liquid 230 may be introduced into the tank inlet 166 prior to a using the tank 152 for its intended purpose such as prior to a flight test of a vehicle. As shown in FIG. 6, when the outer baffle ports 204 are open, liquid 230 may flow between the inner and outer compartments 212, 214. When the outer baffle ports 204 are closed, liquid 230 is confined to the inner compartment 212 while the outer compartments 214 are substantially empty of liquid 230.

Step 308 of the method 300 may include preventing the aircraft CG from exceeding the vehicle CG offset limit 122 during a shift of the liquid CG 232 as a result of the positioning of the outer baffles 202. More specifically, the vehicle CG 120 may be maintained within the vehicle CG offset limits 122 as a result of the positioning of the outer baffles 202 and based on whether the outer baffles 202 are open or closed. The opening or closing of the outer baffles 202 may be based on the desired volume of liquid 230 to be introduced into the tank 152. In the case of a ballast tank 152, the volume of liquid 230 may be dictated by the required mass to be simulated by the liquid 230 ballast. The liquid 230 ballast (e.g., water) may be introduced into the tank 152 prior to takeoff of an aircraft (e.g., a helicopter 102) as part of a flight testing program.

For example, FIG. 6 illustrates an arrangement wherein the outer baffles 202 may be opened for liquid 230 volumes that result in the tank 152 fill level falling between the vertical dimensions shown in FIG. 6. FIG. 10 illustrates an arrangement wherein the outer baffles 202 may be closed for liquid 230 volumes that may be contained within the inner compartment 212. The outer baffle 202 may be positioned such that when the outer baffle ports 204 are closed and the outer compartments 214 are substantially empty of liquid 230, the vehicle CG 120 remains within the vehicle CG offset limit 122 during a shift of the liquid CG 232 for all fill levels of the inner compartment, as shown in the plot of FIG. 9.

Referring briefly to FIG. 11, for arrangements where the vehicle CG 120 exceeds the vehicle CG offset limit 122 for one or more fill levels of the inner compartment 212, the method may include providing the tank 152 with a pair of inner baffles 208 dividing the inner compartment 212 into an inner sub-compartment 216 and one or more outer sub-compartments 218. The inner baffles 208 may be positioned as described above and as illustrated in the plot of FIG. 11. The inner baffle ports 210 may be opened or closed depending upon the volume of liquid 230 to be introduced into the tank 152 and such that the vehicle CG 120 is prevented from exceeding the vehicle CG offset limit 122 during a shift of the liquid CG 232.

For example, if the combined volume of liquid 230 to be introduced into the inner sub-compartment 216 and outer sub-compartments 218 is greater than the total volume of the inner sub-compartment 216, the method may include opening the inner baffles 208 while keeping the outer baffles 202 closed, prior to introducing the liquid 230 into the inner and outer sub-compartments 216, 218 as shown in FIG. 12. If the combined volume of liquid 230 to be introduced into the inner sub-compartment 216 and outer sub-compartments 218 is less than the total volume of the inner sub-compartment 216, the method may include closing the baffle ports of the inner baffles 208 prior to introducing the liquid 230 into the inner sub-compartment 216 as shown in FIG. 14. In this manner, the vehicle CG 120 may be prevented from exceeding the CG offset limit during a shift of liquid CG 232 such as during flight testing.

Figure 24:
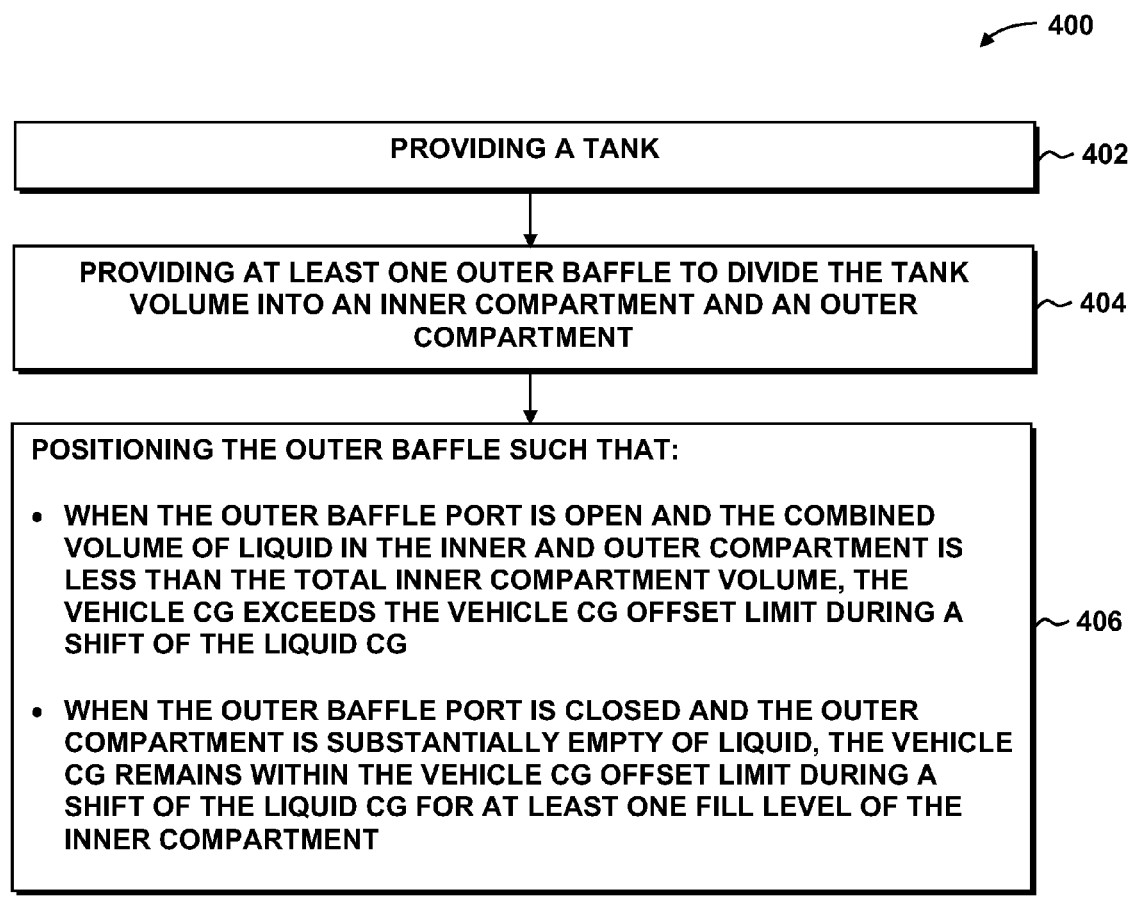
FIG. 24 is an illustration of a flow chart having one or more operations that may be included in a method of manufacturing a tank system and positioning baffles in the tank system.

FIG. 24 shows a flow chart including one or more operations that may be included in a method 400 of manufacturing a tank system 150 having a baffle system 200. Step 402 of the method 400 may include providing a tank 152 as described above. The tank 152 may be configured as a ballast tank 152 such as may be mounted in an aircraft for a flight testing program. However, as indicated above, the tank 152 may be configured for other applications including, but not limited to, a fuel tank 152 or any other storage tank 152 configuration where it is desirable to limit the shifting of the liquid 230 within the tank 152.

Step 404 of the method 400 may include providing at least one outer baffle 202 to divide the tank interior volume 170 into an inner compartment 212 and at least one outer compartment 214. For example, the tank 152 may include a pair of outer baffles 202 as shown in FIG. 4. The outer baffles 202 may be provided with one or more outer baffle ports 204. The outer baffle ports 204 may be closeable by installing a removable plug 206 as described above.

Step 406 of the method 400 may include positioning the outer baffle 202 in the tank 152 such that when the outer baffle ports 204 are open and the combined volume of liquid 230 in the inner and outer compartments 212, 214 is less than the total inner compartment 212 volume, the vehicle CG 120 may exceed the vehicle CG offset limit 122 during a shift of the liquid CG 232. When the outer baffle ports 204 are open and the combined volume of liquid 230 in the inner and outer compartments 212, 214 is greater than the total inner compartment 212 volume, the vehicle CG 120 may remain within the vehicle CG offset limit 122 during a shift of the liquid CG 232. In combination with the above requirements, the positioning of the outer baffle 202 may also be such that when the outer baffle ports 204 are closed and the outer compartment 214 is substantially empty of liquid 230, the vehicle CG 120 remains within the vehicle CG offset limit 122 during a shift of the liquid CG 232 for at least one fill level of the inner compartment 212.

In embodiments where the vehicle CG 120 exceeds the vehicle CG offset limit 122 for certain fill levels of the inner compartment 212, the method may further include providing a pair of inner baffles 208 located inboard of the outer baffles 202 for dividing the inner compartment 212 into an inner sub-compartment 216 and a pair of outer sub-compartments 218 as shown in FIG. 12. In such an arrangement, the method may include positioning the inner baffles 208 within the inner compartment 212 such that when the inner baffle ports 210 are open and the combined volume of liquid 230 in the inner sub-compartment 216 and outer sub-compartments 218 is less than the total volume of the inner sub-compartment 216, a shift in the liquid CG 232 causes the vehicle CG 120 to exceed the vehicle CG offset limit 122. When the inner baffle ports 210 are closed and the outer compartments 214 and outer sub-compartments 218 are substantially empty of liquid 230 and the inner sub-compartment 216 contains liquid 230 at any fill level, the position of the inner baffles 208 may be such that the inner baffles 208 prevent the vehicle CG 120 from exceeding the vehicle CG offset limit 122 during a shift of the liquid CG 232 within the inner sub-compartment 216.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A tank system, comprising:
a tank having a tank volume and mounted in a system having a system center of gravity (CG) and a system CG offset limit;
at least one outer baffle having an outer baffle port and dividing the tank volume into an inner compartment and at least one outer compartment, the outer baffle being positioned such that:
when the outer baffle port is open and a combined volume of liquid in the inner and outer compartment is less than a total inner compartment volume, the system CG exceeds the system CG offset limit during a shift of a liquid CG; and
when the outer baffle port is closed and the outer compartment is substantially empty of liquid, the system CG remains within the system CG offset limit during a shift of the liquid CG for at least one fill level of the inner compartment.

2. The tank system of claim 1, further comprising:
at least one inner baffle having an inner baffle port and dividing the inner compartment into an inner sub-compartment and at least one outer sub-compartment, the inner baffle being positioned within the inner compartment such that:

when the inner baffle port is open and the combined volume of liquid in the inner and outer sub-compartment is less than a total volume of the inner sub-compartment, the system CG exceeds the system CG offset limit during a shift of the liquid CG; and when the inner baffle port is closed and the outer compartment and outer sub-compartment are substantially empty of liquid, the system CG remains within the system CG offset limit during a shift of the liquid CG.

3. The tank system of claim 1, further comprising:
an inner baffle having an inner baffle port and dividing the inner compartment into a pair of sub-compartments; and
the inner baffle being positioned within the inner compartment such that when either one or both of the sub-compartments contain liquid at any fill level, the baffle prevents the system CG from exceeding the system CG offset limit during a shift of the liquid CG.

4. The tank system of claim 1, wherein:
the outer baffle comprises a pair of outer baffles each having an outer baffle port, the outer baffles dividing the tank volume into an inner compartment and a pair of outer compartments located on opposite sides of the inner compartment, the outer baffles being positioned such that:
when the outer baffle ports are open and the combined volume of liquid in the inner and outer compartment is less than the total inner compartment volume, the system CG exceeds the system CG offset limit during a shift of the liquid CG; and
when the outer baffle ports are closed and the outer compartment is substantially empty of liquid, the system CG remains within the system CG offset limit during a shift of the liquid CG for at least one fill level of the inner compartment.

5. The tank system of claim 1, wherein:
the outer baffle includes a plug installable within the outer baffle port, removal of the plug from the baffle port allowing the liquid to flow between the inner and outer compartment.

6. The tank system of claim 1, wherein:
the tank has a length-to-width aspect ratio of greater than 1 and a tank axis oriented horizontally.

7. The tank system of claim 1, wherein:
the tank has a cylindrical shape.

8. The tank system of claim 1, wherein:
the tank has a cylindrical shape including a cylindrical tank wall and a tank axis oriented vertically.

9. The tank system of claim 8, wherein:
the outer baffle is concentric with the cylindrical tank wall, the outer baffle dividing the tank into an inner compartment and an outer compartment having an annular shape surrounding the inner compartment.

10. The tank system of claim 8, wherein:
the system is a vehicle, the system CG is a vehicle CG, and the system CG offset limit is a vehicle CG offset limit.

11. A method of controlling motion of liquid in a tank, comprising the steps of:
providing a tank having a tank volume and configured to be mounted in a system having a system center of gravity (CG) and a system CG offset limit, the tank having at least one outer baffle dividing the tank volume into an inner compartment and at least one outer compartment;
opening or closing an outer baffle port according to the following:
opening the outer baffle port when the liquid to be introduced into the inner and outer compartment has a combined volume greater than a total inner compartment volume;
closing the outer baffle port when liquid is to be introduced into the inner compartment and the outer compartment is to be substantially empty of liquid;
introducing liquid into the tank, the liquid having a liquid CG; and
preventing the system CG from exceeding the system CG offset limit during a shift of the liquid CG.

12. The method of claim 11, wherein the tank includes a pair of inner baffles dividing the inner compartment into an inner sub-compartment and at least two outer sub-compartments, the method further comprising:
opening the inner baffles if a combined volume of liquid to be introduced into the inner and outer sub-compartments is greater than the total volume of the inner sub-compartment;
introducing the liquid into the inner and outer sub-compartments; and
preventing the system CG from exceeding the system CG offset limit during a shift of the liquid CG.

13. The method of claim 11, wherein the tank includes a pair of inner baffles dividing the inner compartment into an inner sub-compartment and at least two outer sub-compartments, the method further comprising:
closing the baffle ports of the inner baffles if a combined volume of liquid to be introduced into the inner and outer sub-compartments is less than the total volume of the inner sub-compartment;
introducing the liquid into the inner sub-compartment at any fill level; and
preventing the system CG from exceeding the system CG offset limit during a shift of the liquid CG.

14. The method of claim 11, wherein the step of providing the tank, opening the baffle port, and introducing the liquid into the tank includes:
providing the tank with a length-to-width aspect ratio of greater than 1 and a tank axis oriented horizontally, the tank having a pair of outer baffle each having a baffle port, the outer baffles dividing the tank volume into an inner compartment and a pair of outer compartments;
opening the baffle ports of the outer baffles if a combined volume of liquid to be introduced into the tank is greater than the total inner compartment volume; and
introducing the liquid into the inner and outer compartments at a combined volume greater than the total inner compartment volume.

15. The method of claim 14, wherein:
the tank has a cylindrical shape.

16. A method of manufacturing a tank system, comprising:
providing a tank having a tank volume and configured for mounting in a system having a system center of gravity (CG) and a system CG offset limit;
providing at least one outer baffle having an outer baffle port and dividing the tank volume into an inner compartment and at least one outer compartment;
positioning the outer baffle such that:
when the outer baffle port is open and a combined volume of liquid in the inner and outer compartment is less than a total inner compartment volume, the system CG exceeds the system CG offset limit during a shift of a liquid CG; and
when the outer baffle port is closed and the outer compartment is substantially empty of liquid, the system CG remains within the system CG offset limit during a shift of the liquid CG for at least one fill level of the inner compartment.

17. The method of claim 16, wherein the step of providing the outer baffle includes:
   providing a pair of closable outer baffles to divide the tank volume into an inner compartment and a pair of outer compartments located on opposite sides of the inner compartment.

18. The method of claim 17, further comprising:
   providing a pair of inner baffles each having an inner baffle port, the inner baffles dividing the inner compartment into an inner sub-compartment and two outer sub-compartments;
   positioning the inner baffles within the inner compartment such that:
      when the inner baffle ports are open and the combined volume of liquid in the inner and outer sub-compartments is less than a total volume of the inner sub-compartment, a shift in the liquid CG causes the system CG to exceed the system CG offset limit; and
      when the inner baffle ports are closed and the outer compartments and outer sub-compartments are substantially empty of liquid and the inner sub-compartment contains liquid at any fill level, the baffles prevent the system CG from exceeding the system CG offset limit during a shift of the liquid CG.

19. The method of claim 16, wherein the step of providing the tank includes:
   providing the tank in a length-to-width aspect ratio of greater than 1 and a tank axis oriented horizontally.

20. The method of claim 16, wherein the step of positioning the outer baffles includes:
   spacing the pair of outer baffles equidistantly from a horizontal tank center.

* * * * *